(12) United States Patent
Nakhla et al.

(10) Patent No.: US 11,806,945 B2
(45) Date of Patent: Nov. 7, 2023

(54) ANTI-ROTATIONAL AND ANTI-TRANSLATIONAL END RING FOR USE IN FILAMENT WINDING A PRESSURE VESSEL

(71) Applicant: MAG Aerospace Industries, LLC, Carson, CA (US)

(72) Inventors: Mario Nakhla, La Mirada, CA (US); Oscar Lopez, Long Beach, CA (US)

(73) Assignee: MAG Aerospace Industries, LLC, Carson, CA (US)

( * ) Notice: Subject to any disclaimer, the term of this patent is extended or adjusted under 35 U.S.C. 154(b) by 0 days.

(21) Appl. No.: 17/771,442

(22) PCT Filed: Oct. 29, 2020

(86) PCT No.: PCT/US2020/058020
§ 371 (c)(1),
(2) Date: Apr. 22, 2022

(87) PCT Pub. No.: WO2021/087150
PCT Pub. Date: May 6, 2021

(65) Prior Publication Data
US 2022/0347942 A1      Nov. 3, 2022

Related U.S. Application Data

(60) Provisional application No. 62/929,730, filed on Nov. 1, 2019.

(51) Int. Cl.
*F17C 1/16*        (2006.01)
*B29C 70/32*       (2006.01)
(Continued)

(52) U.S. Cl.
CPC ............ *B29C 70/32* (2013.01); *B29C 53/602* (2013.01); *B29C 53/62* (2013.01);
(Continued)

(58) Field of Classification Search
CPC ............ B29C 70/32; B29C 2053/8033; B29C 53/602; F17C 1/06; F17C 2205/0305;
(Continued)

(56) References Cited

U.S. PATENT DOCUMENTS 5,568,878 A      10/1996   LeBreton
6,190,481 B1 *    2/2001   Iida ........................... F17C 1/16
                                                           156/173
(Continued)

FOREIGN PATENT DOCUMENTS

WO        2011143723 A2    11/2011

OTHER PUBLICATIONS

International Patent Application No. PCT/US2020/058020, International Search Report and Written Opinion, dated Feb. 16, 2021.
(Continued)

*Primary Examiner* — Stephen J Castellano
(74) *Attorney, Agent, or Firm* — Kilpatrick Townsend & Stockton LLP

(57) ABSTRACT

A polar end ring mechanism for use with composite pressure vessels. The end ring is designed to support a pressure vessel during its formation via filament winding. The end ring helps define an opening at one of the polar ends of a tank. Spikes positioned along a portion of the end ring help prevent rotation or translation of the tank during formation and provide an improved mechanical lock with the tank body. A cap may then be secured to the polar end ring after formation in order to close the pressure vessel.

9 Claims, 7 Drawing Sheets

(51) Int. Cl.
    *B29C 53/60*    (2006.01)
    *B29C 53/62*    (2006.01)
    *B29C 53/80*    (2006.01)
    *B29L 31/00*    (2006.01)

(52) U.S. Cl.
    CPC ........... *B29C 53/8008* (2013.01); *F17C 1/16* (2013.01); *B29C 2053/8033* (2013.01); *B29L 2031/7156* (2013.01); *F17C 2209/2163* (2013.01)

(58) Field of Classification Search
    CPC ...... F17C 2205/0308; F17C 2201/0109; F17C 2209/2163; F17C 1/16
    See application file for complete search history.

(56) References Cited

U.S. PATENT DOCUMENTS

| | | | |
|---|---|---|---|
| 6,216,856 B1* | 4/2001 | Park | B43M 99/003 |
| | | | 206/214 |
| 2007/0205201 A1 | 9/2007 | Cundiff et al. | |
| 2017/0254477 A1* | 9/2017 | Schimenti | F17C 1/14 |
| 2017/0297259 A1* | 10/2017 | Otsubo | B29C 65/48 |
| 2018/0194277 A1* | 7/2018 | Lobo | B60R 13/005 |
| 2019/0049068 A1* | 2/2019 | Sawai | B32B 15/14 |
| 2022/0373085 A1* | 11/2022 | Kovalevsky | F16J 12/00 |

OTHER PUBLICATIONS

Europe Patent Application No. 20811861.2, Communication under Rule 71 (3) EPC—Intention to Grant, dated Mar. 23, 2023.

\* cited by examiner

ANTI-ROTATIONAL AND ANTI-TRANSLATIONAL END RING FOR USE IN FILAMENT WINDING A PRESSURE VESSEL

This application is the national stage (Rule 371) of international application No. PCT/US2020/058020 filed 29 Oct. 2020. This application claims the benefit of U.S. Provisional Application Ser. No. 62/929,730, filed Nov. 1, 2019 titled "Anti-Rotational and Anti-Translational Polar End Ring," the entire contents of which are hereby incorporated by reference.

FIELD OF THE DISCLOSURE

According to certain embodiments of this disclosure, there is provided a polar end ring mechanism for use with composite pressure vessels. The end ring is designed to support a pressure vessel during its formation via filament winding as well as reacting pressure and/or installation loads during its service life. The end ring helps define an opening at one of the polar ends of a tank. Spikes positioned along a portion of the end ring help prevent rotation or translation of the tank during formation and provide an improved mechanical lock with the tank body for better load reaction. A cap may then be secured to the polar end ring after formation in order to close the pressure vessel.

BACKGROUND

Filament winding is a fabrication technique that can be used for manufacturing open structures, such as cylinders, or closed end structures, such as pressure vessels or tanks. The process involves winding filaments under tension over a rotating mandrel. The mandrel rotates around a spindle that has an axis. A delivery eye on a carriage traverses horizontally (usually in line with the axis of the rotating mandrel), and lays down fibers onto the mandrel in a desired pattern or angle. Common filaments used are glass or carbon, impregnated in a bath with resin as they are wound onto the mandrel. Once the mandrel has been wound and is completely covered to the desired thickness, the resin is allowed to cure. Depending upon the resin system that is used and its cure characteristics, the rotating mandrel may be placed in an oven or under radiant heaters until the wound material is cured.

Once the resin has cured, the mandrel may be removed or extracted, leaving the hollow final product. For other products, the mandrel may be left in place, such that it forms a permanent part of the finished product. For example, the mandrel may form a liner to prevent gas leakage or may function as a barrier to protect the composite from the fluid to be stored. In this instance, the mandrel produces a finished inner surface and the wound material provides a laminate surface on the outside diameter of the product.

In order for the resulting pressure vessel to be used in order to contain fluids, the opening at the end of the vessel (which is used to secure the vessel to the winding equipment during formation) needs to be securely closed. One way this can occur is to seal a cap to close the opening. In some instances, an end ring may be used as a starting point for the winding process, and a cap may be sealed or adhered to the end ring. Improvements to end rings are desirable.

SUMMARY

Accordingly, the present inventors have designed an improved end ring for use in filament composite winding of pressure vessels. Particular pressure vessels that incorporate the disclosed end ring may be used in connection with aircraft and other aerospace applications, such as waste tanks, fuel tanks, and any other types of liquid-containing or pressure vessels. The disclosed end ring has a series of spikes or protrusions that help prevent rotation or translation of the vessel during winding.

The terms "invention," "the invention," "this invention" "the present invention," "disclosure," "the disclosure," and "the present disclosure," used in this patent are intended to refer broadly to all of the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of various aspects of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

In one example, there is provided an end ring for use in filament winding a pressure vessel, comprising an outer flange; a platform supporting at least one spike, the at least one spike comprising a base dimension and a tapered portion. In the preceding or any subsequent examples, the tapered portion may end at a point. In any of the preceding or subsequent examples, there is a plurality of spikes. In any of the preceding or subsequent examples, at least one or all of the spikes comprise a surface feature. The surface feature may be one or more grooves. The surface feature may be a diamond knurled surface. In any of the preceding or subsequent examples, the end ring has a central opening. A cap may be provided to seal the central opening. In any of the preceding or subsequent examples, the outer flange may have a curved upper surface, which can help form a curved dome of the pressure vessel.

In any of the preceding examples, there may be provided a method of forming a pressure vessel via filament winding, comprising providing an end ring of any of the above examples, rotating the end ring on a rotating mandrel, and laying down filament fibers to form a pressure vessel with the end ring defining at least one polar end of the pressure vessel.

DETAILED DESCRIPTION

Figure 8:
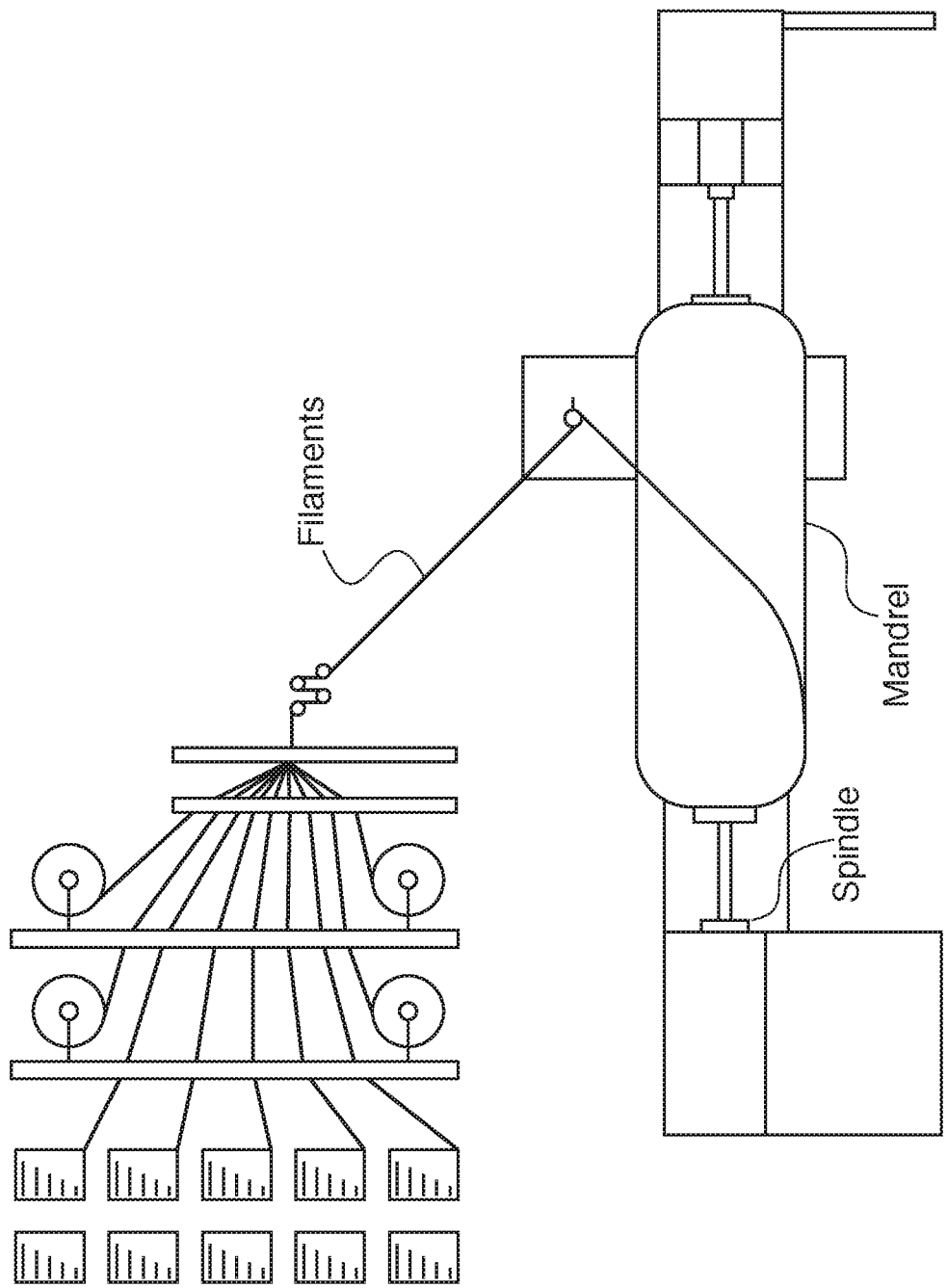
FIG. 8 shows an example of a pressure vessel being formed via filament winding.

Embodiments of the present disclosure provide an end ring 10 that is designed to be incorporated onto a composite pressure vessel that is formed via filament winding and/or other composite pressure construction methods. FIG. 8 shows an exemplary process of filament winding. In this process, a mandrel rotates around a spindle as fibers or filaments are laid down in a pattern onto the rotating mandrel. The resulting vessel that is formed is cured, and once finished, useable as a pressure vessel. An end ring may be used as a starting point for the winding process. The end ring can be secured to the spindle and rotates along with the rotating mandrel.

Figure 1:
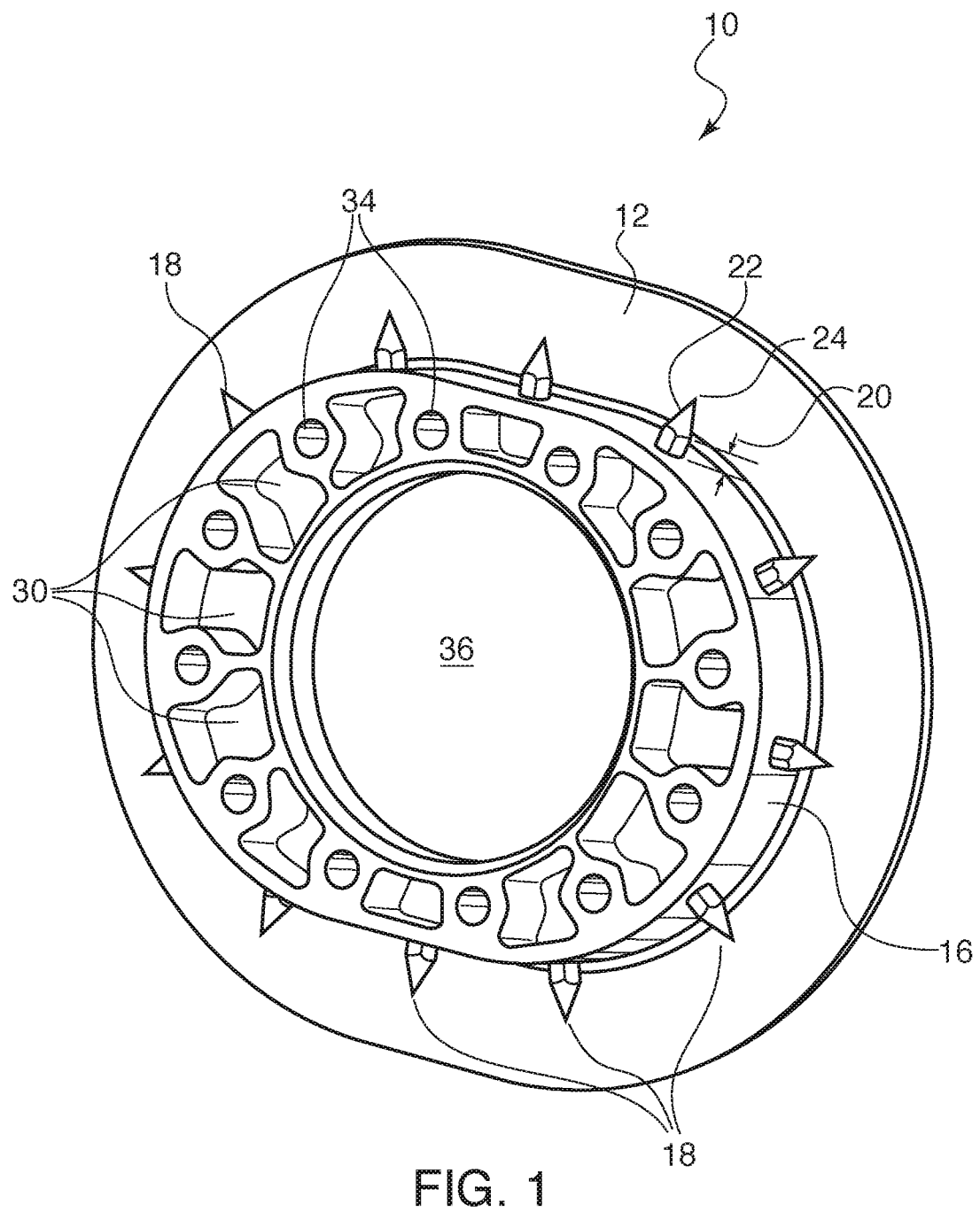
FIG. 1 shows a front perspective view of one embodiment of an end ring.
Figure 2:
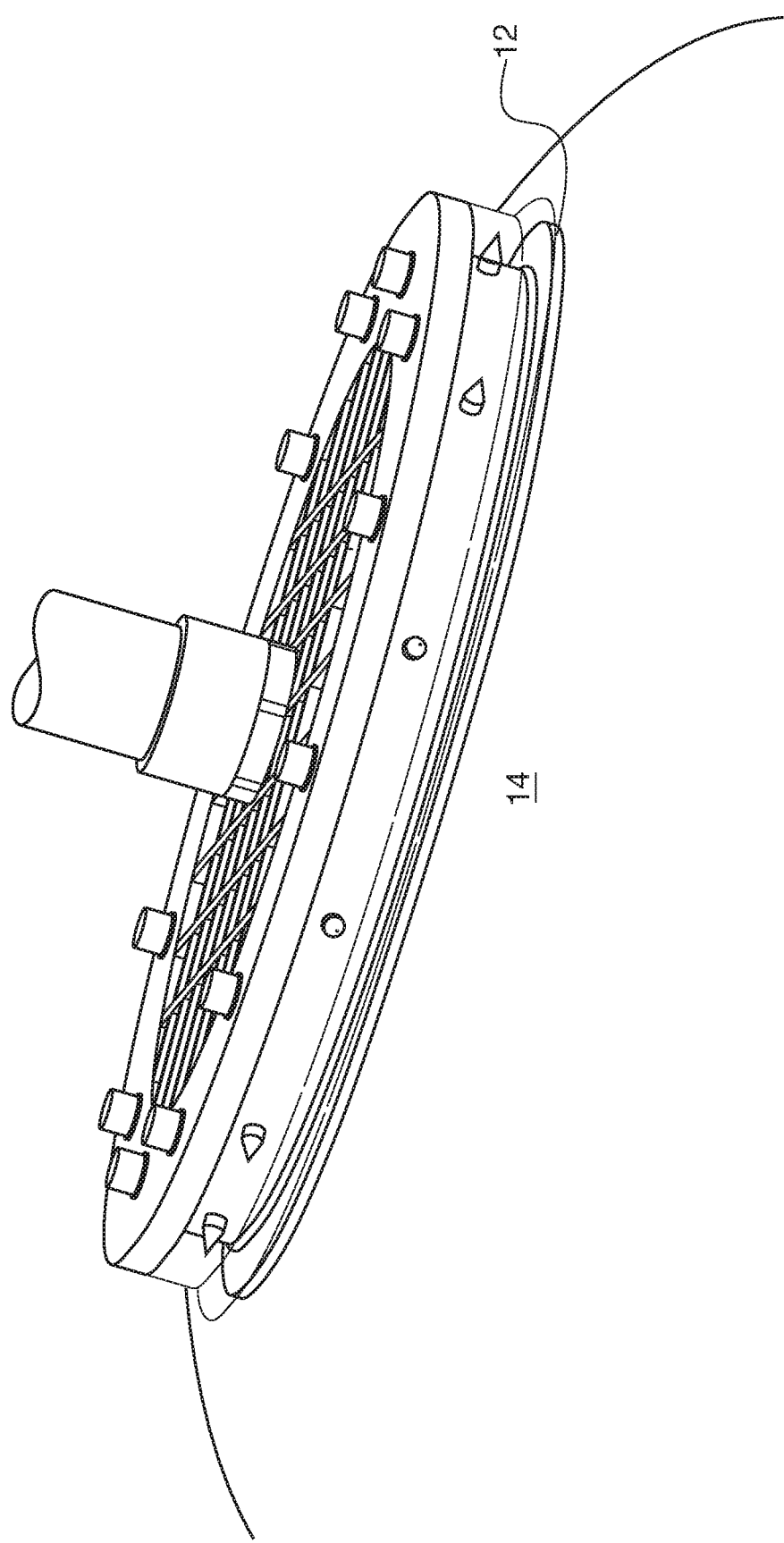
FIG. 2 shows a side perspective view of the end ring of FIG. 1 in position on a pressure vessel.
Figure 3A:
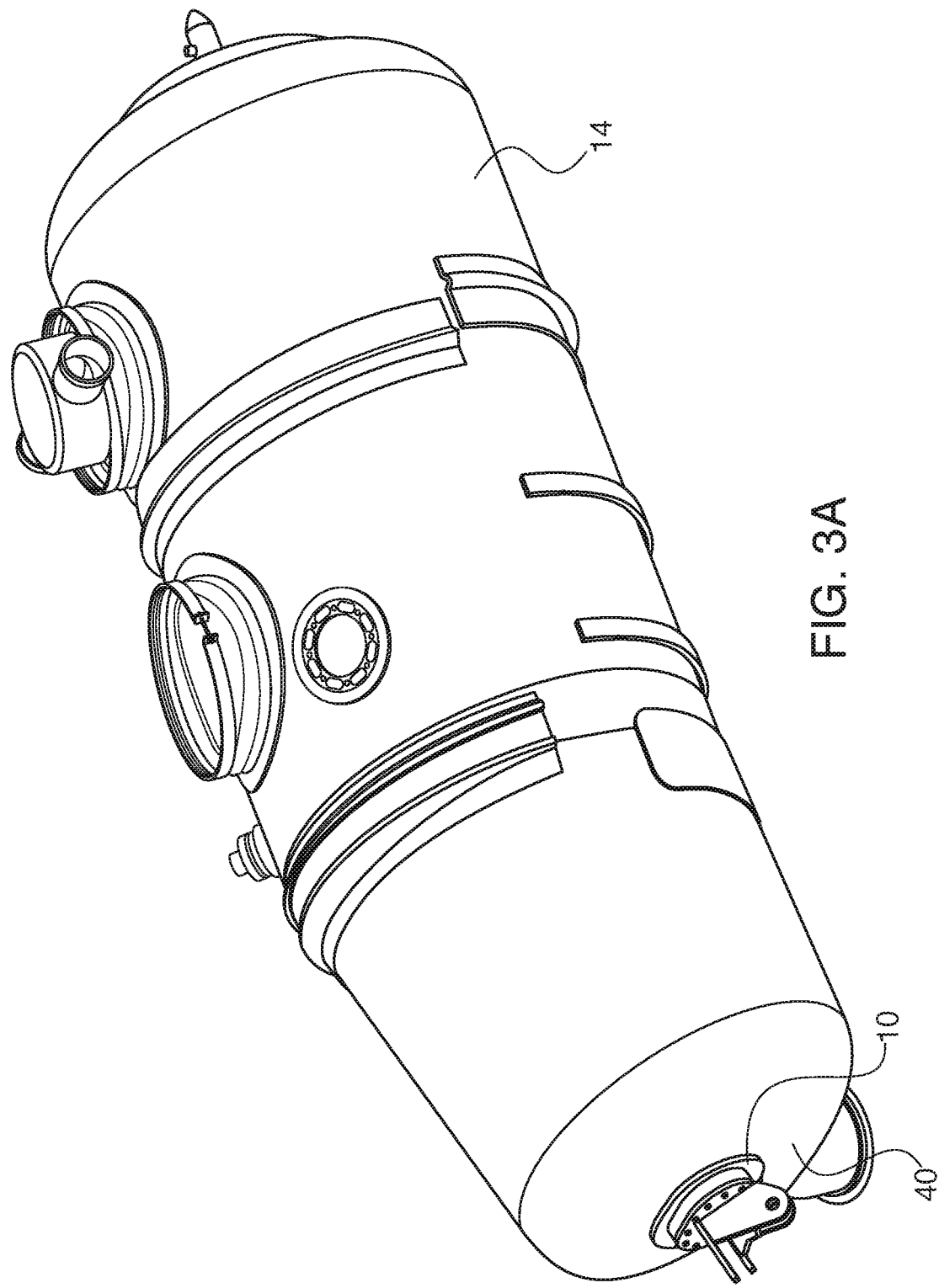
FIG. 3A shows a side perspective view of an aircraft tank having an end ring positioned at least one of its polar ends.
Figure 3B:
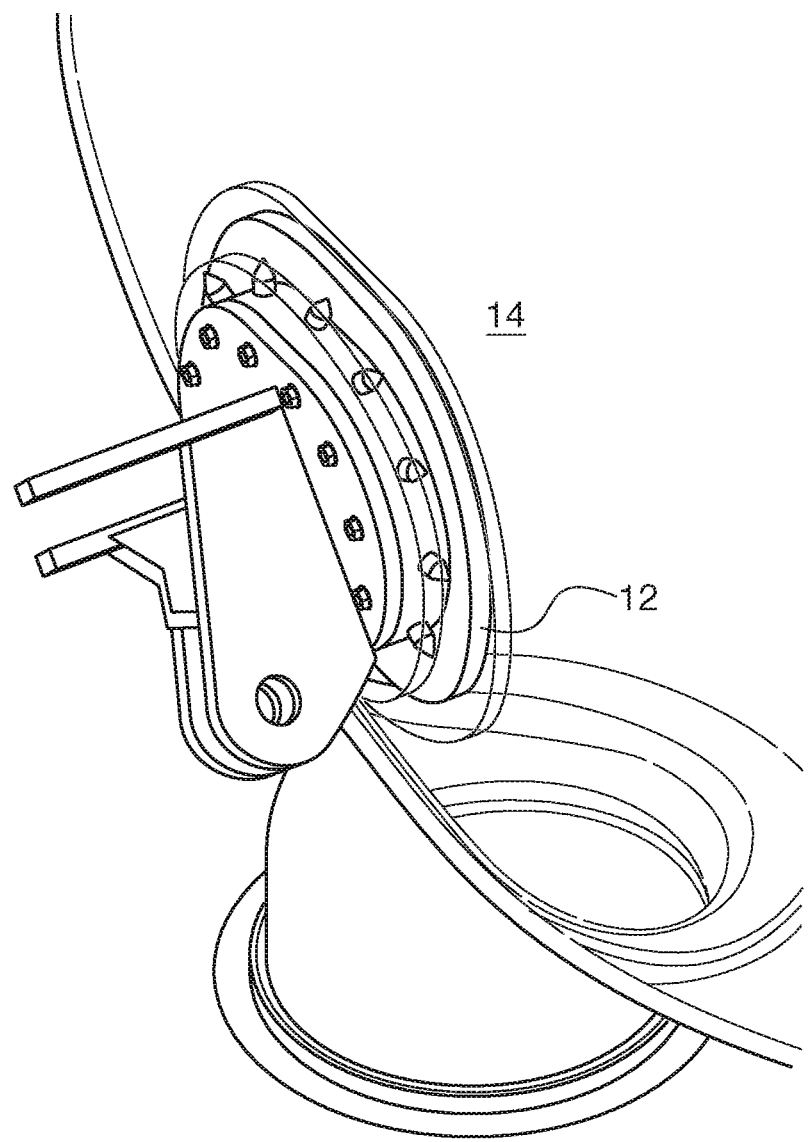
FIG. 3B shows a close up view of the end ring at the aircraft tank dome.

FIG. 1 illustrates one example of an end ring 10 according to this disclosure. The end ring 10 shown has an outer flange 12 that defines an outer perimeter of the ring 10. During formation of a pressure vessel 14, the outer flange 12 can be wound into the vessel wall itself, such that it becomes embedded into the vessel. An example of this is illustrated by FIG. 2. It is also possible for the flange 12 to define an interior surface of the vessel, rather than being formed into the vessel itself. The end ring 10 is intended to be wound-in and integrated into the winding process. The end ring 10 can be incorporated as part of the composite pressure vessel filament winding process, lending itself to a wound-in ring integrated into the wound vessel and eliminating secondary bonding operations of the ring 10. Examples are illustrated by FIGS. 3A and 3B.

Referring back to FIG. 1, inward of the outer flange 12 is a platform 16 along which is positioned a plurality of raised spikes 18. The platform 16 is raised slightly away from the outer flange 12 in order to provide a surface for filaments to be wound and supported by the end ring 10. The platform 16 is illustrated as having a generally oval shape, but it should be understood that other shapes are possible and considered within the scope of this disclosure. The spikes 18 function as anti-rotational features, anti-translational features, or both. For example, the spikes 18 can prevent the end ring 10 from rotating and/or translating with respect to the mandrel and/or the vessel during formation or in its final form. The spikes 18 are intended to be wound-in and integrated into the winding process. These spikes 18 "bite" or penetrate into the carbon filament band during winding, creating a mechanical lock and increasing contact surface area. The spikes 18 become embedded into the vessel as a part of the vessel itself.

In one embodiment, the spikes 18 have a base dimension 20 and a tapered (or conical) portion 22 that tapers to a point 24. The point 24 has a smaller dimension than the base dimension 20. The base dimension 20 may have a circular shape. In another example as shown by FIG. 1, the base dimension 20 may have a knurled shape or be provided as a series of flat-sides that form a generally round base. It should also be understood that the base dimension 20 may have any other appropriate shape, such as square, rectangular, triangular, oval, or any other appropriate option. FIG. 1 illustrates an example in which the tapered portion 22 is smooth. It should be understood, however, that the tapered portion 22 may be provided with various surface features that can help increase purchase between the spikes 18 and the material being wound.

Figure 4:
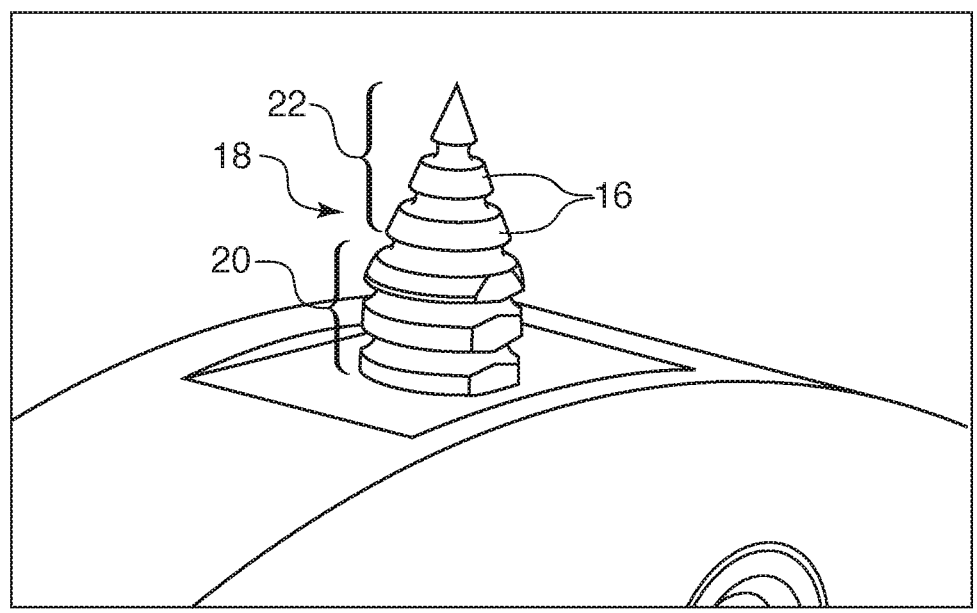
FIG. 4 shows a side perspective view of an optional spike surface feature.

One exemplary spike surface feature is to provide one or more of the spikes 18 with a series of grooves 26 along any combination of the base dimension 20 or the tapered portion 22 or both. The grooves 26 may be just along the base dimension 20, just along the tapered portion 22, or along the entirety of the spike 18. FIG. 4 illustrates a series of grooves 26 along the entirety of the spike 18. The grooves 26 may be individual grooves, each having a circular shape that encircles the spike, as shown by FIG. 4. In an alternate embodiment, the grooves 26 may form a spiral shape, similar to screw threads along the body of the spike. In this example, the spiral shape can create a single groove that angles up/down along with the spike 18.

Figure 5:
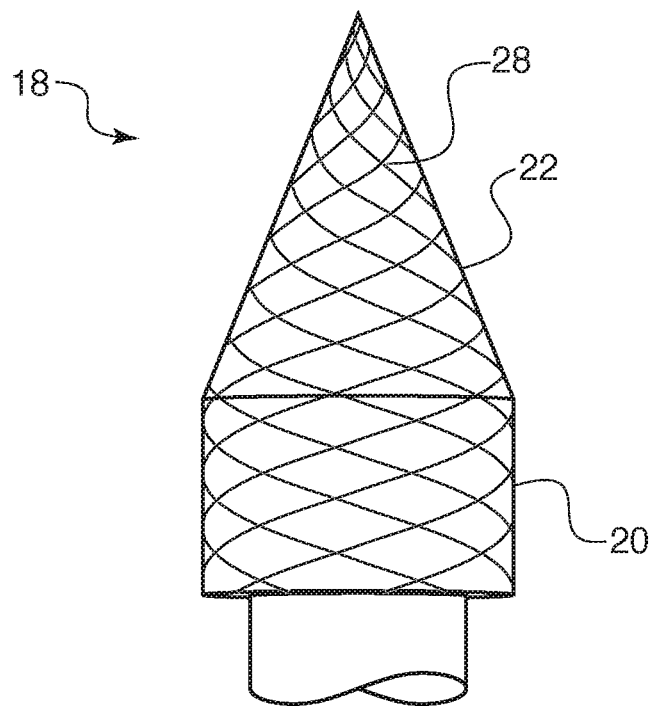
FIG. 5 shows a side plan view of an alternate optional spike surface feature.

Another exemplary spike surface feature is to provide one or more of the spikes 18 with a diamond cut or knurled surface 28 along any combination of the base dimension 20 or the tapered portion 22 or both. The diamond cut or knurled surface 28 may be just along the base dimension 20, just along the tapered portion 22, or along the entirety of the spike 18. FIG. 5 illustrates a diamond cut surface 28 along the entirety of the spike 18.

Providing one or more of these alternate surface features can help improve the "bite" or purchase between the spikes in the wound carbon/resin filament material. The surface features can increase the surface area for cooperation between the materials. These surface features can help improve mechanical lock between the materials.

As shown by FIGS. 1 and 2, it is possible for the spikes 18 to be positioned about equidistant from one another along the platform 16. Depending upon the size of the vessel to be formed (and consequently the size of the end ring 10 to be used) and the load requirements, the number of spikes and position relative to each is defined by the stress requirements to react to the expected loads. The loads are defined as the internal and/or external pressure loads, as well as installation loads induced by the final pressure vessel support structure. Loads can also be a combination of pressure and installation loads driven by the support structure. In one example, the minimum distance between spikes may be equal to the base diameter of a single spike to preserve sufficient wall thickness between spikes. This is particularly important in the case of plastics rings. The maximum distance between spikes is not as limiting and shall be defined based on the load requirements to be reacted. In one specific example, the spikes may be positioned about one diameter length of the spike base apart from one another. In other examples, the spikes 18 may be positioned at varied distances from one another, depending upon the stresses or pressure during formation and/or operational load requirements of the vessel. The number of spikes 18 provided is dependent upon the load requirement. In the specific example illustrated by FIG. 1, twelve spikes 18 are positioned around the platform 16. However, it should be understood that as few as one or two spikes may be used, and any additional number of spikes may be used as necessary.

As also shown by FIG. 1, the platform 16 may be provided with a series of pockets 30. These pockets 30 can function as securement points during injection molding of the end ring 10, as well as lightening features of the final part due to the removed material. Interspersed between the pockets may also be circular features 34. In specific example, the circular features may be threaded and function to receive the polar end cap bolts/screws, securing the cap to the ring and sealing the pressure vessel shut. The features 34 can also be used to house inserts (conventional metal/metal inserts in case of metal rings and/or molded-in/ultrasonic welded in case of plastic rings).

FIG. 1 also illustrates a central opening 36 of the end ring 10. Central opening 36 is received by a spindle of the mandrel during formation/rotation/winding of the vessel. In order to close the central opening 36 once the vessel is formed, it is possible to provide a cap configured to be secured over the central opening 36. This can help render the formed vessel watertight. The cap may be mounted onto the end ring 10 via securement features that can be received by circular features 34. Alternatively, the cap may be secured to the end ring 10 via a V-band clamp that may cooperate with an optional beaded end of the platform edge. Alternatively, the cap may be secured to the end ring 10 via adhesive bonding, or any other appropriate securement method.

By forming the vessel with an embedded end ring 10, it is possible to eliminate a secondary bonding step of applying an end ring 10 to the finished vessel. The spikes 18 of the end ring become embedded into the vessel. As is shown by the side view of FIG. 6, the outer flange 12 may be provided with a slight curvature or angle of its upper surface 38. This curvature or curved angle of the upper surface 38 may correspond to the curvature of the tank dome 40, illustrated by FIG. 3A. This allows the end ring 10 to be positioned so that the tank done 40 curvature is appropriately formed.

Figure 7:
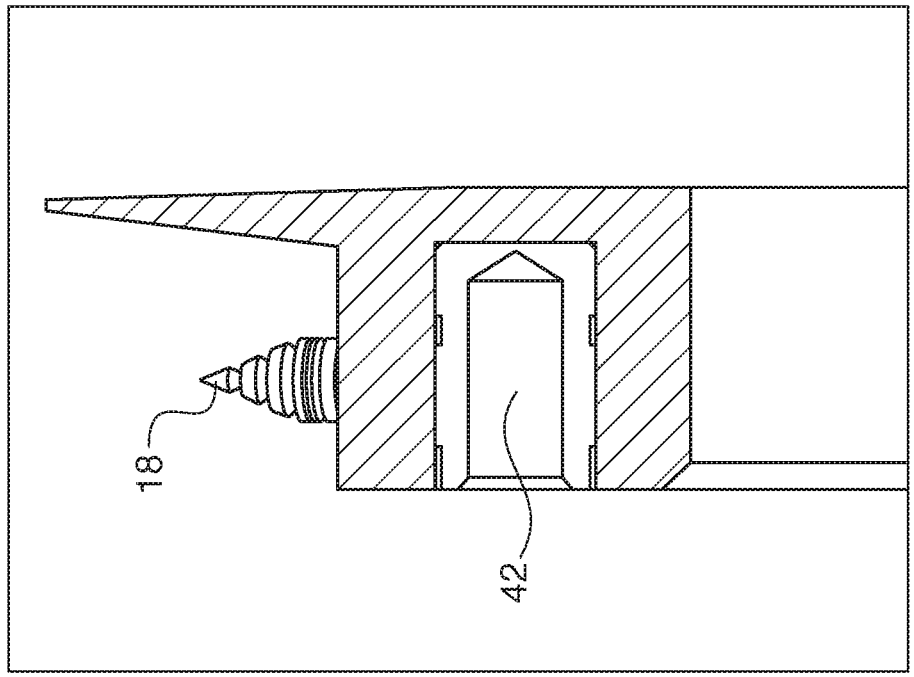
FIG. 7 shows a side cross-sectional view of FIG. 6.
Figure 6:
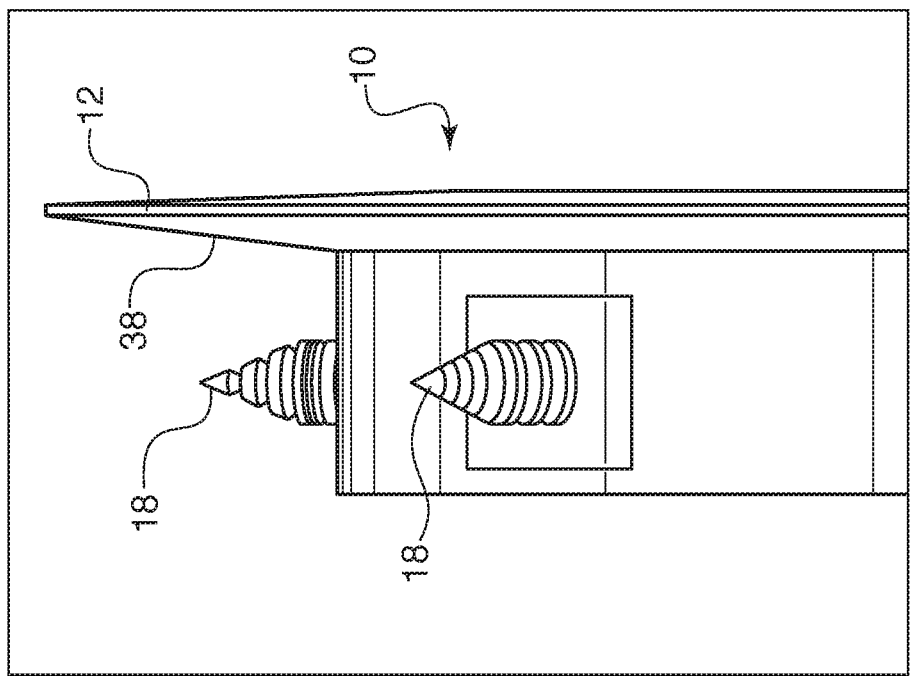
FIG. 6 shows a side plan view of an end ring, illustrating a curved upper surface of the outer flange.

FIG. 7 shows a side cross-sectional view of FIG. 6, illustrating a securement feature 42 that may be used to secure a cap in place to cover the central opening 36 of the end ring 10.

The subject matter of certain embodiments of this disclosure is described with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

It should be understood that different arrangements of the components depicted in the drawings or described above, as well as components and steps not shown or described are possible. Similarly, some features and sub-combinations are useful and may be employed without reference to other features and sub-combinations. Embodiments of the invention have been described for illustrative and not restrictive purposes, and alternative embodiments will become apparent to readers of this patent. Accordingly, the present invention is not limited to the embodiments described above or depicted in the drawings, and various embodiments and modifications may be made without departing from the scope of the claims below.

What is claimed is:

1. An end ring for use in filament winding a pressure vessel, comprising:
   an outer flange defining a first end of the end ring; and
   a platform comprising a side surface and an end surface, the platform inward of the outer flange along an axis, wherein the end surface of the platform defines a second end of the end ring such that the platform and the outer flange define opposing ends of the end ring along the axis,
   wherein the end ring defines a central opening extending from the first end to the second end,
   wherein at least one spike extends outwards in a radial direction relative to the central opening from the side surface of the platform,
   wherein the at least one spike comprising a base dimension and a tapered portion, the tapered portion having a smaller dimension than the base dimension, and
   wherein at least one pocket is defined in the end surface of the platform, the at least one pocket comprising a pocket surface recessed into the platform.

2. The end ring of claim 1, wherein the tapered portion ends at a point.

3. The end ring of claim 1, wherein the at least one spike comprises a plurality of spikes.

4. The end ring of claim 1, wherein the at least one spike comprises a surface feature.

5. The end ring of claim 4, wherein the surface feature comprises one or more grooves.

6. The end ring of claim 4, wherein the surface feature comprises a diamond knurled surface.

7. The end ring of claim 1, further comprising a cap configured to seal the central opening.

8. The end ring of claim 1, wherein the outer flange comprises a curved upper surface.

9. A method of forming a pressure vessel via filament winding, comprising:
   providing the end ring of claim 1,
   rotating the end ring on a rotating mandrel;
   laying down filament fibers to form a pressure vessel with the end ring defining at least one polar end of the pressure vessel.

* * * * *